Oct. 14, 1958  L. D. COBB  2,856,208
CLOSURE
Filed Feb. 23, 1956

INVENTOR
LELAND D. COBB
BY Edward H. Goodrich.
HIS ATTORNEY

United States Patent Office 2,856,208
Patented Oct. 14, 1958

2,856,208
CLOSURE

Leland D. Cobb, Forestville, Conn., assignor to General Motors Corporation, Detroit, Mich., a corporation of Delaware Application February 23, 1956, Serial No. 567,142

6 Claims. (Cl. 286—5)

This invention relates to a closure for closing the space between a pair of relatively rotatable members and particularly to a seal or shield for closing the end of an annular lubricant chamber in an antifriction bearing to retain lubricant within the bearing and to exclude dust, water and other deleterious materials from entering the bearing.

The life of an antifriction bearing having a series of rolling elements between a pair of relatively rotatable race rings is largely dependent upon maintaining a small predetermined volume of a required lubricant within the bearing and in preventing the entrance of dirt, water and other contaminants into the bearing. Various closures have been employed to seal the ends of an antifriction bearing, but have usually been insufficiently effective when such a bearing is operated in very dusty or abrasive conditions and/or under conditions where there is considerable moisture present.

It is, therefore, an object to provide an improved and simply constructed end closure for retaining lubricant in the annular chamber between a pair of relatively rotatable members and for excluding deleterious materials from entering the lubricant chamber.

A further object is to provide an improved end closure for an antifriction bearing which will not only sealingly close the lubricant chamber in the bearing but will also divert contaminants such as water and dirt outwardly and away from the bearing.

To these ends and also to improve generally upon devices of this character, my invention consists in the various matters hereinafter described and claimed. In its broader aspects, the invention is not necessarily limited to the specific structure selected for illustrative purposes in the accompanying drawings wherein:

Figures 1, 2, 3:
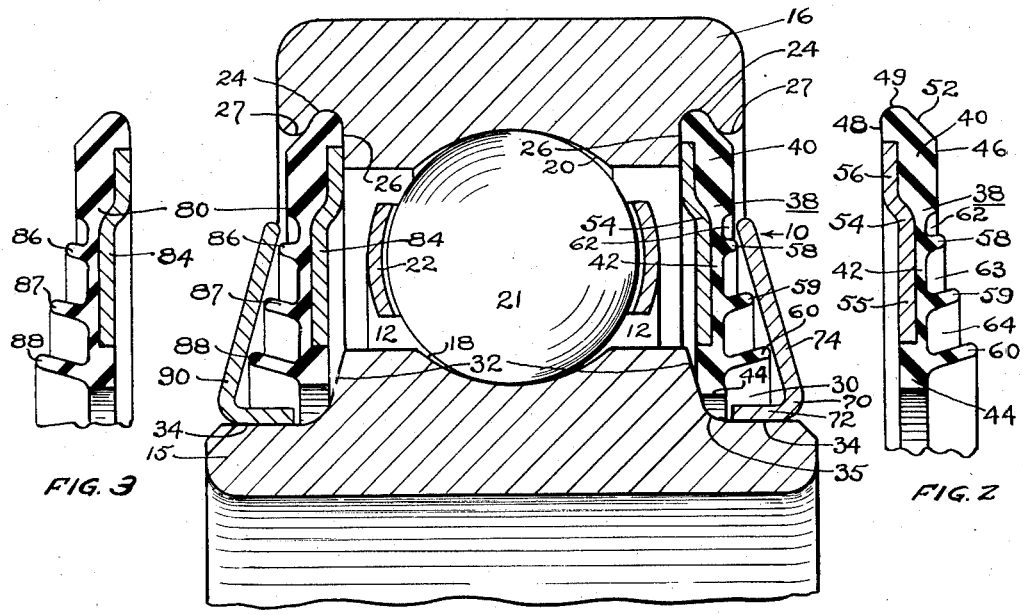
Figure 1 is a cross sectional view of a portion of my closure.
Figure 2 is a fragmentary cross sectional view of my sealing washer at the right hand end of Figure 1.
Figure 3 is a fragmentary cross sectional view of the shield closure at the left hand end of Figure 1.
Figure 4:
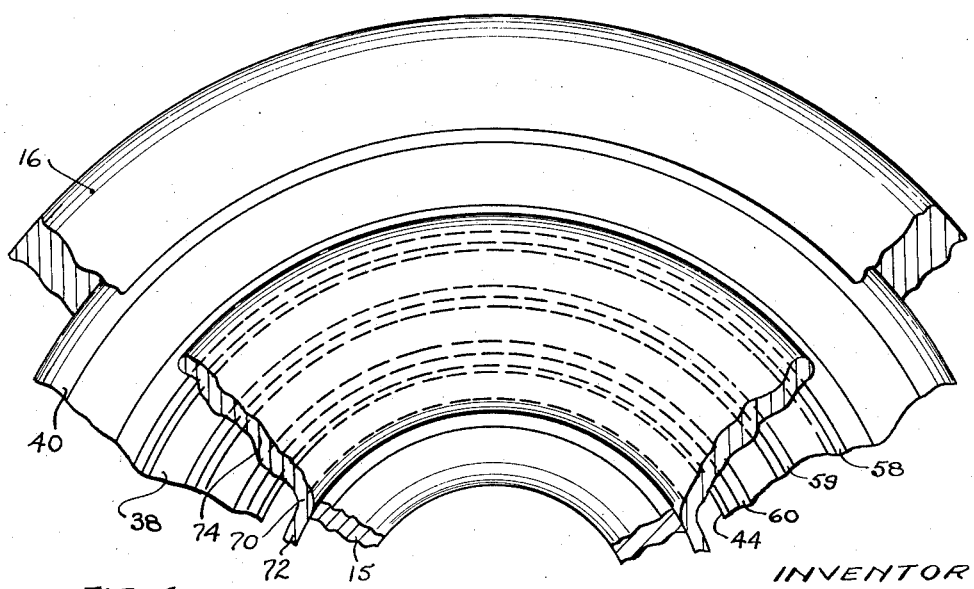
Figure 4 is a fragmentary end view of a bearing with my closure installed.

My closure, as 10, closes the end of an annular lubricant chamber 12 located between a pair of relatively rotatable members herein shown as the inner and outer race rings 15 and 16 of an antifriction bearing provided with opposed annular raceways 18 and 20 that receive rolling elements such as a series of balls 21 located in circumferentially spaced relation by a suitable separator or cage 22. Each end of one of the race rings, as 16, has an annularly extending mounting groove 24 which is transversely curved between an annular generally radially disposed shoulder 26 and a transversely rounded annular land 27 whose diameter is between that of the bottom of the groove and that of an inner cylindrical wall of this race ring. Each end of the other race ring, as the inner race ring 15, has an annularly extending notch 30 coaxial of the race ring and provided with a frusto-conical wall 32 and a cylindrical wall 34, these walls preferably merging with an intermediate arcuate portion 35.

In the closure at the right hand end of Figure 1 and in Figure 2, there is provided a reinforced rubber-like sealing washer 38 having a resiliently deformable bead 40 from which radially extends intermediate its width a narrow annular wall 42 terminating in an annular yieldable sealing lip 44. The bead 40 has generally radially disposed front and rear faces 46 and 48. A transversely rounded peripheral face 49 of the bead preferably merges with the flat rear face 48 and with a frusto-conical bead face 52. A stepped reinforcing disc 54, which may be stamped out and formed from suitable sheet meal, is preferably bonded to the washer 38 within a corresponding annular sealing washer recess and has a flat body portion 55 merging with the sealing lip 44 and a flat flanged portion 56 that is coextensive with the rear face 48 of the bead. The body portion 55 is laterally offset from the flanged portion 56 to add rigidity to the seal and to provide additional lubricant space within the chamber 12 as well as to avoid any possible interference with the separator 22. The front face of the reinforcing disc is preferably bonded throughout its entire extent to the sealing washer and the rear face of the disc may be exposed. A plurality of deformably resilient annular ribs as 58, 59 and 60 extend from the front of the wall 42 and preferably frusto-conically away from the axis of the sealing washer to provide annular collector grooves 62, 63 and 64. The outer ends of the ribs 58, 59 and 60 are preferably rounded and terminate at successively greater distances from the front of the wall 42. The sealing washer 38 may be molded to the desired shape and composed of various inherently resilient rubber-like materials which are not appreciably affected by heat, light or bearing lubricants. One suitable rubber-like material comprises a resilient vulcanized synthetic rubber containing a polymerization product of butadiene and acrylic nitrile and is frequently referred to as buna N rubber. The reinforcing disc 54 may be initially positioned in the mold and the synthetic rubber formed about it so that the rubber will bond or vulcanize to this disc during the curing of the rubber-like material in the mold.

In mounting the sealing washer 38 in the bearing, the resilient bead 40 is snapped past the land 27 into deformably seated sealing relation against the walls of the groove 24. The diameter of the bead preferably slightly exceeds that of the bottom of the groove to assure sealing engagement of the bead. The washer 38 is axially located in required position by the seating of the flange 56 and bead wall 48 against the shoulder 26 and the frusto-conical wall 52 deformably and sealingly wedges against a corresponding wall of the groove 24. With the sealing washer seated in this position, the sealing lip 44 lightly and deformably engages in desired sealing contact with the frusto-conical wall 32 to prevent lubricant leakage from the bearing.

The bore diameter of the sealing lip 44 preferably exceeds the diameter of the cylindrical race ring wall 34 so that the seal is free to flex and maintain an effective sealing engagement with the wall 32 even in the event of misalignment of the race rings. A slinger member 70, which may be shaped from a suitable material as sheet metal bent to form, has a cylindrical hub 72 press-fitted over the race ring wall 34 and a frusto-conical slinger flange 74 which is angularly directed back towards the bearing preferably terminates adjacent to the annular groove 62 as shown. The angular relation of the flange 74 to the hub 72 is preferably such that the inner wall of this flange lies in closely spaced relation to the rounded ends of the annular ribs 58, 59 and 60. However, if desired, this flange 74 may be located in lightly wiping contact with the rounded ends of these resilient ribs.

When a bearing equipped with my improved seal and slinger is operated in the presence of dirt, dust, moisture or other deleterious contaminants, the slinger flange 74 which rotates with the race ring 15 will divert most of the contaminants away from the bearing. The small amount of the deleterious materials that may enter between the slinger and the seal will temporarily collect in the grooves 62, 63 and 64. However, the rapid rotation of the slinger flange 74 closely adjacent to these collector grooves 62, 63 and 64 creates a suction which draws the material from the collector grooves and slings it away from the periphery of the flange 74 thus preventing objectionable materials from entering the bearing.

The closure shown at the left hand end of the bearing is generally similar to that above described and includes a shield 80 mounted in the groove 24 and extending across the lubricant chamber into close proximity with a frusto-conical wall 32 of the rotatable inner race ring 15. It should be noted that the bore of this shield slightly exceeds that of the sealing lip 44 of the seal 38 so that there is usually a slight clearance between the inner edge of the shield and the inner race ring. The shield, which is reinforced by a disc 84 similar to the disc 54, also has annularly extending spaced frusto-conical ribs 86, 87 and 88 in operatively associated relation to a rotatable slinger 90 in the same manner as described with reference to the sealing washer 38 and the slinger 70.

I claim:

1. In a closure for positioning across an annular lubricant chamber between a pair of relatively rotatable members, a deformably resilient radially disposed disc secured to one of the relatively rotatable members and extending across the lubricant chamber into close relation with said other member, a rotatable slinger secured to said other relatively rotatable member, an annular flange on the slinger outside of the lubricant chamber and adjacent to a side of said disc, and an annularly extending resiliently yieldable frusto-conical rib projecting laterally outwardly from the disc intermediate the width of said disc and into wiping relation with said flange, said rib and said flange cooperating to prevent material from entering past the disc into the lubricant chamber.

2. In a closure for positioning across an annular lubricant chamber between a pair of relatively rotatable members, a resilient rubber-like disc secured at its periphery to one of the relatively rotatable members and extending radially across the lubricant chamber into wiping sealing relation with said other member, a rotatable slinger secured to the other relatively rotatable member, an annular flange on the slinger extending alongside a side of the disc outside of the lubricant chamber, and a plurality of deformably resilient radially spaced annularly extending frusto-conical ribs projecting laterally outwardly from the resilient disc into lightly wiping engagement with said flange, said ribs providing annularly disposed collector grooves which cooperate with the flange to prevent ingress of deleterious material into the lubricant chamber.

3. In a closure for positioning across an annular lubricant chamber between a pair of relatively rotatable members, an annular disc of inherently resilient material peripherally secured to one of the relatively rotatable members and radially extending across the lubricant chamber, an annular lip on said disc in sealingly wiping engagement with said other member, a reinforcing member secured to said disc within the lubricant chamber and seated against one of said relatively rotatable members, a slinger secured to said other relatively rotatable member, an annular flange on the slinger extending generally radially outwardly alongside the disc outside of the lubricant chamber, and a deformably resilient annular frusto-conical rib projecting laterally from the disc intermediate the width of said disc and into closely spaced relation with said flange, said rib and said flange cooperating to prevent material from entering past the disc into the lubricant chamber.

4. In a closure for positioning across an annular lubricant chamber between a pair of coaxial annular members only one of which is rotatable, an inherently resilient deformable disc peripherally secured to the non-rotatable member and radially extending across the lubricant chamber into wiping sealing relation with said other member, a slinger pressed over the rotatable member and having an outwardly extending frusto-conical flange extending towards the lubricant chamber and located in spaced relation to the disc outside of the lubricant chamber, and a plurality of deformably resilient annularly extending radially spaced frusto-conical ribs projecting outwardly from the disc into closely spaced relation with said flange, said ribs diverging angularly away from the axis of the disc.

5. In a closure for positioning across an annular lubricant chamber between a pair of coaxial annular members, one of said members being non-rotatable and said other member being rotatable, an inherently resilient disc extending alongside an end of the lubricant chamber, a resiliently deformable peripheral portion on the disc yieldably seated against one of the relatively rotatable members, a resilient annular lip on the disc in sealingly wiping engagement with said rotatable member, a slinger secured to said rotatable member, an annular flange on the slinger adjacent to the disc outside of the lubricant chamber and frusto-conically disposed axially inwardly towards said disc, and an annularly extending resilient frusto-conical rib projecting laterally from the disc into yieldable wiping relation with said slinger flange, said rib being angularly directed outwardly and away from the disc axis and providing a collector groove opening onto the slinger flange.

6. In a closure for positioning across an annular lubricant chamber between a pair of relatively rotatable members one of which has an annular groove radially opening towards said other member, an annular disc of inherently resilient material extending across an end of the lubricant chamber, a peripherally extending inherently resilient bead on the disc deformably and sealingly seated against the walls of said groove, an annular sealing lip on the disc yieldably engaging said other member, a stepped reinforcing ring bonded to the disc and engaging a side wall of said groove, a slinger member mounted on said other relatively rotatable member, a radially outwardly extending generally frusto conical annular flange on the slinger outside of the lubricant chamber and adjacent to said disc, and a plurality of radially spaced annularly extending ribs laterally extending through succeedingly greater distances from the disc and away from said reinforcing ring into proximity with said flange, said ribs being frusto-conically disposed with respect to the disc axis to provide spaced grooves in the disc opening onto said flange.

References Cited in the file of this patent

UNITED STATES PATENTS

| 1,831,224 | Baumann | Nov. 10, 1931 |
| 2,275,996 | Searles | Mar. 10, 1942 |
| 2,310,607 | Batesole | Feb. 9, 1943 |
| 2,419,885 | Cooper | Apr. 29, 1947 |
| 2,467,049 | Peterson | Apr. 12, 1949 |
| 2,639,954 | Potter | May 26, 1953 |
| 2,705,161 | Shafer | Mar. 29, 1955 |
| 2,714,022 | Nelson | July 26, 1955 |
| 2,734,757 | Martin | Feb. 14, 1956 |